United States Patent
Hoeger

(10) Patent No.: US 8,573,941 B2
(45) Date of Patent: Nov. 5, 2013

(54) TANDEM BLADE DESIGN

(75) Inventor: Martin Hoeger, Erding (DE)

(73) Assignee: MTU Aero Engines GmbH, Munich (DE)

( * ) Notice: Subject to any disclaimer, the term of this patent is extended or adjusted under 35 U.S.C. 154(b) by 206 days.

(21) Appl. No.: 13/145,753

(22) PCT Filed: Mar. 15, 2010

(86) PCT No.: PCT/DE2010/000269
§ 371 (c)(1),
(2), (4) Date: Jul. 21, 2011

(87) PCT Pub. No.: WO2010/105597
PCT Pub. Date: Sep. 23, 2010

(65) Prior Publication Data
US 2011/0318172 A1    Dec. 29, 2011

(30) Foreign Application Priority Data

Mar. 16, 2009    (DE) .......................... 10 2009 013 399

(51) Int. Cl.
*F01D 9/04*    (2006.01)
*F01D 5/14*    (2006.01)

(52) U.S. Cl.
USPC ................... 416/200 A; 416/223 A; 416/243; 416/DIG. 2; 415/181; 415/193; 415/209.1; 415/914

(58) Field of Classification Search
USPC ........... 415/119, 181, 193–195, 199.4, 199.5, 415/209.1, 914; 416/198 A, 200 A, 201 R, 416/231 B, 223 A, 243, DIG. 2, DIG. 53
See application file for complete search history.

(56) References Cited

U.S. PATENT DOCUMENTS

| | | | | |
|---|---|---|---|---|
| 3,059,834 A | * | 10/1962 | Hausammann | 415/218.1 |
| 3,075,743 A | | 1/1963 | Sheets | |
| 3,442,441 A | * | 5/1969 | Dettmering | 415/193 |
| 4,483,659 A | | 11/1984 | Armstrong | |
| 5,676,522 A | * | 10/1997 | Pommel et al. | 415/181 |
| 6,099,249 A | * | 8/2000 | Hashimoto | 415/199.4 |
| 6,350,103 B1 | * | 2/2002 | Hashimoto et al. | 415/199.5 |
| 6,715,983 B2 | * | 4/2004 | Koshoffer et al. | 415/193 |

FOREIGN PATENT DOCUMENTS

| | | |
|---|---|---|
| DE | 69914823 T2 | 12/2004 |
| DE | 69730663 T2 | 9/2005 |

* cited by examiner

*Primary Examiner* — Christopher Verdier
(74) *Attorney, Agent, or Firm* — Barlow, Josephs & Holmes, Ltd.

(57) ABSTRACT

A tandem blade design for an axial turbomachine, comprising a front blade and a rear blade disposed with an offset thereto in the circumferential direction and in the axial direction. The rear blade is profiled and positioned with respect to the front blade such that it raises the speed level at the trailing edge of the front blade in a predetermined working range in interaction with the front blade.

8 Claims, 2 Drawing Sheets

Typical profile section through a tandem blade

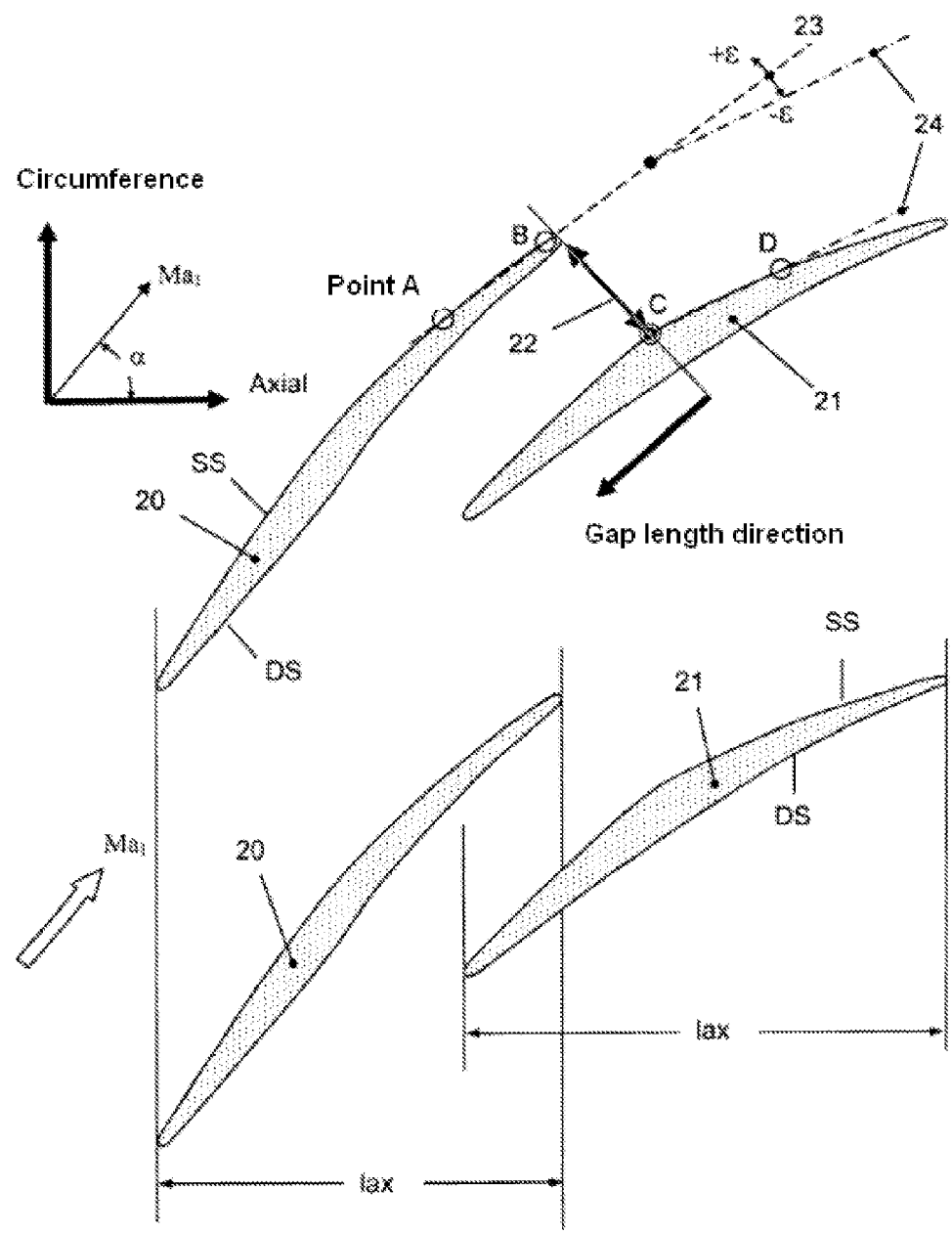
Fig. 1: Typical profile section through a tandem blade

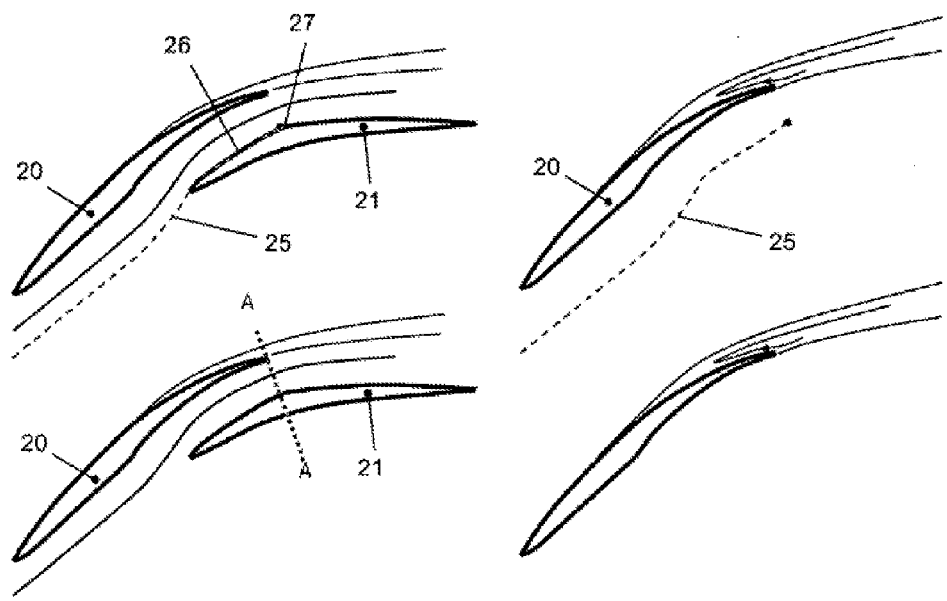
Fig. 2: Streamlines on the tandem cascade
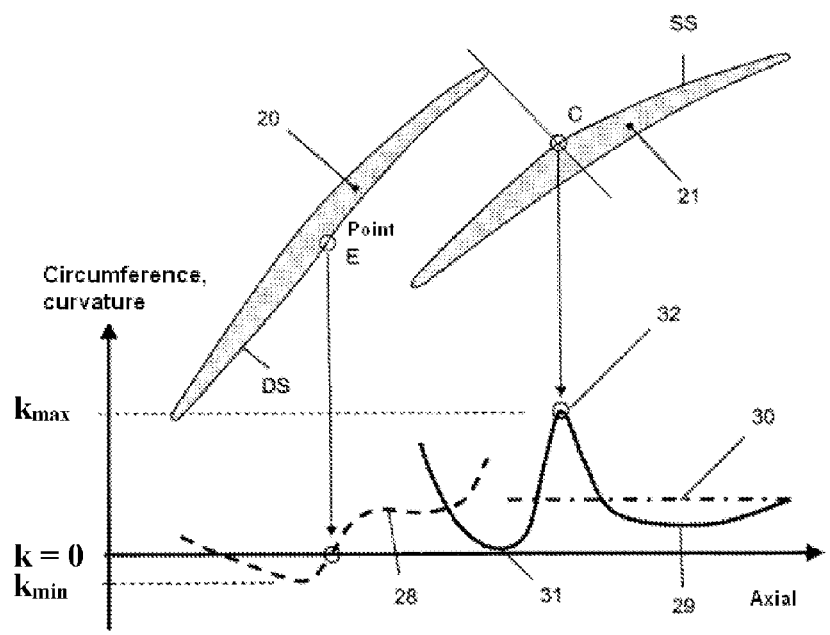
Fig. 3: Curvature on the tandem profile

TANDEM BLADE DESIGN

The present invention relates to a tandem blade design of an axial turbomachine.

In general in a turbocompressor, energy is added to a flowing fluid following the laws of fluid mechanics. This design operates continuously and is usually distinguished by a small pressure increase per stage and a high volume throughput. For this reason multiple compressor stages are usually connected in series, each of which consists of rotor blades forming a rotor and guide blades forming a stator. The enthalpy transformed in each stage in the guide blades is wholly or partially converted into compression energy. The kinetic flow energy is transmitted to the rotor blades by the deflection because of a circumferential force. In other words, the stator reduces angular momentum and converts it into pressure, with the rotor transferring work in the form of angular momentum to the flow.

Particularly in an axial compressor the gas to be compressed flows parallel to the axis through the compressor. Because of the expansion of the cross section in the blade channels and the transfer of work, the pressure and the temperature rise, while the speed drops. The kinetic energy needed for the further pressure buildup is again supplied to the fluid in the rotating part of a compressor stage (impeller, rotor).

To increase the efficiency of a compressor stage, the front stages of modern compressors, particularly in aircraft engines and gas turbines, are usually of transonic design, since the temperatures are still low here and a higher Mach number can be obtained with the same flow velocity. In the case of such a transonic axial compressor, the flow velocity accordingly exceeds the speed of sound, at least locally, in the relative system (relative to a rotating blade).

The advantage of the transonic design consists of the relatively high power densities, which is particularly important in aircraft engine compressors, since the whole system can be kept more compact in that way. However, this compressor subassembly is characterized by complex systems of compressor shocks that make the design and stable operation of the compressor considerably more difficult. Also a drawback are the high losses that accompany the compression shocks and that can be overcome only by complex three-dimensional blading and elaborate blade geometries.

In the state of the art as described, for example, in EP 0 823 540 B1, that when a pressure ratio in an individual stage in an axial compressor exceeds a value of about 1.5, a shock wave is formed between adjacent rotor blades that is generated from a leading edge of a pressure face of a rotor blade speeding ahead up to an intermediate section of a suction face of the directly adjacent trailing rotor blade. Consequently a stream of air is detached downstream from the shock wave (a boundary layer) from the suction face of the trailing rotor blade, whereby the power of the compressor is very substantially reduced. To eliminate this problem, EP 0 823 540 B1 proposes the arrangement of a tandem blade cascade for the supersonic region, in which the front blades of each tandem blade are shaped and positioned so that a shock wave is generated along a line between the leading edge region of the pressure face of each front blade and the trailing edge region of the opposite suction face of each rear blade, with the front blade and the rear blade of each tandem blade being shaped and positioned so that a stream of air that emerges from a gap between the trailing edge of the front blade and the leading edge of the rear blade flows on the suction face of the rear blade so that a boundary layer is maintained on it.

This measure makes it possible to configure the front blade so that the site of formation of the shock wave is shifted toward a rear section of the suction face of the front blade, with the stream of air from the gap to the suction face of the rear blade being regulated through the front blade so that the boundary layer on the suction face of the rear blade is maintained. As a result, a greater deflection is achieved by the tandem design with the weight being reduced overall, and with shorter structural length, which leads to higher degrees of efficiency. The operating range of the blades is also improved.

Despite these technical improvements, the losses are accumulated in the tandem blade with the design described above because of the increasing flow resistance here, which again destroys some of the achievable performance increases. Tandem structural forms with conventional types of profiles have also been made up to this time, since each blade by itself has been designed for a desirable airflow. However, considering the entire system of tandem blade designs, this does not produce a pressure distribution that is optimal for the tandem arrangement.

In view of this state of the art, the problem underlying the present invention is to make available a tandem blade design that has a higher efficiency.

This problem is solved by a tandem blade design of the present invention.

The invention consequently is based on the fundamental consideration of separating the blade-related tasks in such a way that the front blade is assigned the main function of manipulating the ultrasound, and the rear blade is given the main function of flow deflection, with the blades being optimized according to their assigned functions. This inventive concept can be translated structurally when the rear blade is positioned and/or profiled relative to the front blade in such a way that it raises the speed level on the trailing edge of the front blade. This structural measure provides the prerequisite for designing the front blade functionally, for example with a convex curvature toward its trailing edge, without having to consider any premature detachment of the boundary layer because of the profiling of the front blade. In other words, a flow-related functional unsuitability of the front blade is knowingly accepted in compromise for the optimization of its main assigned function and is then corrected by profiling and positioning the rear blade functionally in such a way that the suction generated on its top face again pulls the boundary layer detaching from the front blade back to the top face of the blade and deflects it correspondingly. In other words, the functionally optimized front blade is functionally efficient in terms of flow technology only in cooperation with the rear blade.

As a result, a higher aerodynamic load can be installed than with the described prior art, with higher coverage, i.e. a shorter structure. This enables more efficient, lighter, and more economical axial compressor designs, which can lead to saving one whole stage.

Other advantageous configurations of the invention are the subject of the subclaims.

The invention will be explained in further detail below on the basis of a preferred example of embodiment with reference to the accompanying drawings.

FIG. 1 shows the representation of the principle for a tandem blade design pursuant to a preferred example of embodiment of the invention with characteristic angular data, FIG. 2 shows the profile curve of the front blade for the tandem blade design according to the invention to illustrate a convex curvature and the flow properties of a front blade of the tandem blade design according to the invention with and without a rear blade, and FIG. 3 shows the tandem blade design according to the invention with relevant curvature data.

FIG. 1 shows a tandem blade design pursuant to the invention based on a preferred example of embodiment. The tandem blade design accordingly provides for the arrangement of a front blade 20 and a rear blade 21 that form a blade gap 22 between them. The rear blade to this end is offset from the front blade in the circumferential and axial directions in such a way that the two blades partially overlap both along the gap and viewed in the axial direction, i.e. they overlap over a predetermined length of the profile chord. This overlap region can amount to up to 50% of the entire length of the profile chord of the front or rear blade viewed in the gap width direction.

To identify characteristic angular regions, Point A in FIG. 1 on the suction face of the front tandem blade 20 is set at 75% of the axial chord length and Point B is set at 95% of the axial chord length, by which a line 23 is defined. In the same way with the rear tandem profile 21, a line 24 on the suction face of profile 21 is defined downstream from Point D through Point C on the gap (location of the minimum distance from the blade 20) and Point D at a distance of 20% of the axial chord length from the profile 21. It is a characteristic feature of the present design that the mean angle of the blade 21 downstream from the gap 22 (line 24) is smaller than/equal to the mean angle of the line 23 in the trailing edge region of the front blade 20 (line 23 corresponds approximately to the outflow angle of the front blade 20 in the tandem cascade). It is preferred for the angle $\epsilon$ between the lines 23 and 24 to have the value $\epsilon = -5°$ to $-10°$.

The front blade has a cross-sectional profile that in the rear section (preferably the rear 50% of the chord length) provides for a sharp convex curvature. The term "sharp" in this context shall be defined as a value at which, in the intended operating range of the blade, no interaction with the rear blade is to be expected in any case with a flow detachment in the mentioned rear section of the front blade (see FIG. 2, left). The rear blade in FIG. 2 has a region 26 with atypically small or even negative curvature in the forward 25% of the chord length, followed by a small region with high curvature 27, that together with the trailing edge of the front blade lies in a plane A perpendicular to the flow (corresponds at this point somewhat to the direction of the gap width). Because of the high coverage (degree of overlap) of the front and rear blades formed thereby, a particularly desirable interaction occurs for the front blade with sharp convexity and the rear blade with high curvature in the plane A.

As seen from FIGS. 2 and 3, the front blade in the central area of the chord length shows a large change of curvature on its pressure face. The front blade is also designed here so that its streamline next to the pressure face assumes a course similar to that of the obstruction point 27 of the rear blade along with the suction face streamline to just in front of the trailing edge region of the front blade. A maximum deflection can be achieved by this with small losses.

The present tandem blade design is also characterized by its special curvature distributions 28, 29 in FIG. 3. Thus the front blade has a point of inflection in the course of the curvature at Point E on the pressure face DS. Point E lies between 40% and 95% of the axial chord of the profile 20. The curvatures are negative upstream from Point E. A mean curvature 30 is defined on the suction face of the rear blade 21. A minimum curvature 31 upstream from Point C that has a value of less than 0.7 times the mean curvature 30 is characteristic for the rear blade 21. A maximum curvature 32 whose value is more than 1.3 times the mean curvature of the suction face of profile 21 follows at a small distance downstream on the suction face of profile 21. Preferred values for the minimum and maximum curvatures on the suction face of the rear tandem blade are $K_{max} = 2 * K_{mean}$ and $K_{min} = 0$.

More efficient, lighter, and more economical axial compressor designs are possible with the tandem blade design pursuant to the invention. Even one entire compressor stage can perhaps be spared. The tandem blade design pursuant to the invention can thus be used in particular for rotors and/or stators of front stages of an axial compressor and discharge guide vanes.

At this point, however, reference will continue to be made to flow specifics in stators.

In transonic compressor stages, the optimal rotor design is limited by the maximum allowable inflow Mach number at $MA1_{max} = 0.85$ of the following stator. If it is possible to bring about higher inflow Mach numbers at the stator, a larger stage pressure ratio, an optimal inlet guide vane setting (and angular momentum before the upstream rotor), and thereby better efficiencies become possible. Furthermore, the small operating range customary for conventional transonic stators could be broadened.

As stated at the outset, tandem blade designs known up to now have conventional types of profiles that neither have optimal pressure distribution for the tandem arrangement nor permit high inflow Mach numbers. In addition, transonic stators up to now have had to be designed as adjustable stators because of the partial load requirements. The cost of construction is high because of the adjustment actuator system, and they are heavier and cost more.

The inventor has found that by providing a tandem stator preferably using the tandem blade design pursuant to the invention, a compressor stage can be designed with an optimal degree of reaction with respect to pressure ratio and efficiency. High inflow Mach numbers $Ma1 > 0.85$ are obtained here that can be controlled only by the new stator design, preferably with the tandem blade design pursuant to the invention with minimal loss coefficients. The separation of the deflection task into supersonic and subsonic components also permits covering the partial load requirements without adjustment. Because of the suction effect of the rear stator blade described above, high inflow angle changes can be controlled without adjustment.

To optimize an axial compressor of an aircraft turbine, therefore, it is possible either to equip only the rotor with a tandem blade design pursuant to the invention, and/or to design the stator as a tandem blade stator, preferably corresponding to the tandem blade design pursuant to the invention. Therefore, the layout for a compressor stage is bi-tandem or a rotor-tandem stator configuration that has transonic afflux flow in the region of the stator hub.

The present invention in summary relates to a tandem blade design for an axial turbomachine comprising a front blade and a rear blade in a position offset from it in the circumferential and axial directions. The rear blade is profiled and positioned from the front blade so that in the predetermined operating range it interacts with the front blade and raises the speed level at the trailing edge of the front blade.

The invention claimed is:

1. A tandem blade design of an axial turbomachine comprising a front blade and a rear blade offset from the front blade in the circumferential and axial directions, wherein the rear blade is profiled and positioned relative to the front blade so that in the predetermined operating range the rear blade interacts with the front blade and raises the air speed level at the trailing edge of the front blade wherein the front and rear blades partially overlap viewed both in a flow direction and in the circumferential direction; wherein the front blade has a convex curvature in its rear section such that in the predetermined operating range a flow detachment occurs at its suction face without interaction with the rear blade with a turbulent boundary layer; wherein the suction face of the rear blade is in facing relation with the pressure face of the front blade and detachment of the flow at the suction face of the front blade can be prevented by the increase of the speed level brought about by the rear blade; and wherein the rear blade has a small to negative curvature in its forward region, followed by a middle region with high curvature that together with the trailing edge of the front blade lies in a plane perpendicular to the flow wherein the front blade has a change of algebraic sign of the curvature on the pressure face upstream from the region of convex curvature.

2. The tandem blade design according to claim 1, wherein the curvature of the rear blade has a minimum curvature being smaller than 0.7 times the mean suction face curvature of the rear blade.

3. The tandem blade design according to claim 2, wherein the curvature of the middle region is about 1.3 times that of the mean curvature of the suction face of the rear blade.

4. The tandem blade design according to claim 3, wherein the forward region on the suction face of the rear blade extends upstream of the curvature maximum over about 2% to 30% of the chord length of the rear blade.

5. The tandem blade design according to claim 4, wherein the forward region on the suction face of the rear blade extends upstream of the point of maximum curvature in the middle region on the rear blade over about 25% of the chord length of the rear blade.

6. The tandem blade design according to claim 1, wherein the region of the convex curvature of the front blade extends over 50% to 100% of its chord length.

7. The tandem blade design according to claim 1, wherein the mean angle on the suction face of the front blade between 75% and 95% of the axial chord length is larger/the same as the mean angle on the suction face of the rear blade between the point of maximum curvature in the middle region and a point on the rear blade suction face 20% of the axial chord downstream from the point of maximum curvature, so that the outflow angle $\alpha$ from the front blade is greater than the mean suction face angle of the rear blade downstream from a gap between the front blade and the rear blade.

8. The tandem blade design of claim 1, wherein the front blade and the rear blade form a tandem blade construction configured for use in a supersonic stator.

\* \* \* \* \*